US012803376B2

(12) United States Patent
Lisec

(10) Patent No.: US 12,803,376 B2
(45) Date of Patent: Nov. 17, 2026

(54) MOTOR BEARING SHIELD

(71) Applicant: Black & Decker Inc., New Britain, CT (US)

(72) Inventor: Tyler J. Lisec, York, PA (US)

(73) Assignee: BLACK & DECKER INC., New Britain, CT (US)

(*) Notice: Subject to any disclaimer, the term of this patent is extended or adjusted under 35 U.S.C. 154(b) by 241 days.

(21) Appl. No.: 18/817,422

(22) Filed: Aug. 28, 2024

(65) Prior Publication Data

US 2025/0088072 A1 Mar. 13, 2025

Related U.S. Application Data

(60) Provisional application No. 63/537,876, filed on Sep. 12, 2023.

(51) Int. Cl.

| | |
|---|---|
| ***H02K 5/15*** | (2006.01) |
| ***H02K 1/2786*** | (2022.01) |
| ***H02K 7/08*** | (2006.01) |
| ***H02K 7/14*** | (2006.01) |

(52) U.S. Cl.

CPC ........... *H02K 7/083* (2013.01); *H02K 1/2786* (2013.01); *H02K 5/15* (2013.01); *H02K 7/14* (2013.01)

(58) Field of Classification Search

CPC ........ H02K 1/2786; H02K 7/145; H02K 5/15; F16C 33/7886; F16C 33/78

See application file for complete search history.

(56) References Cited

U.S. PATENT DOCUMENTS

| | | | |
|---|---|---|---|
| 5,895,207 | A | 4/1999 | Burgdorf et al. |
| 7,005,766 | B2 | 2/2006 | Suzuki et al. |
| 10,439,473 | B2 | 10/2019 | Hirokawa et al. |

(Continued)

FOREIGN PATENT DOCUMENTS

| | | | |
|---|---|---|---|
| EP | 2351940 | B1 | 10/2014 |
| EP | 2589829 | B1 | 5/2015 |

(Continued)

OTHER PUBLICATIONS

Extended European Search Report mailed Feb. 2, 2025 in related EP application No. 24197669.5, 6 pages.

*Primary Examiner* — Oluseye Iwarere
*Assistant Examiner* — Masoud Vaziri
(74) *Attorney, Agent, or Firm* — Amir R. Rohani

(57) ABSTRACT

An electric motor is provided including: a stator including windings, a rotor arranged outside the stator and supporting at least one permanent magnet in magnetic interface with the windings, a bearing including a first portion and a second portion arranged to rotationally support the rotor relative to the stator, and a bearing shield located adjacent the bearing within the rotor. The bearing shield includes a first annular portion in contact with the first portion of the bearing, a flexible portion including elastically deformable material that biasingly maintains the first annular portion in contact with the first portion of the bearing, and a second annular portion that extends proximate the second portion of the bearing and forms an air gap therebetween. The air gap is sized to allow relative rotation between the second annular portion and the second portion of the bearing but substantially block passage of metal particles.

19 Claims, 7 Drawing Sheets

(56) References Cited

U.S. PATENT DOCUMENTS

| | | | |
|---|---|---|---|
| 10,763,720 B2 | 9/2020 | Horng et al. | |
| 11,081,933 B2 | 8/2021 | Fogle et al. | |
| 11,283,339 B2 | 3/2022 | Sueyoshi et al. | |
| 11,285,586 B2 | 3/2022 | Muramatsu et al. | |
| 11,374,478 B2 | 6/2022 | Sueyoshi et al. | |
| 11,437,900 B2 | 9/2022 | Billings et al. | |
| 2019/0032787 A1* | 1/2019 | Klein-Hitpass | F16J 15/3292 |
| 2020/0067372 A1* | 2/2020 | Ikeno | A47L 5/14 |
| 2020/0217367 A1* | 7/2020 | Ikeno | H02K 5/15 |
| 2021/0119509 A1 | 4/2021 | Wang et al. | |
| 2021/0194321 A1 | 6/2021 | Jefferies et al. | |
| 2021/0359575 A1* | 11/2021 | Fogle | H02K 7/145 |
| 2022/0209602 A1 | 6/2022 | Wilde et al. | |
| 2022/0209614 A1 | 6/2022 | Walter et al. | |
| 2022/0224184 A1 | 7/2022 | Goos et al. | |
| 2022/0247251 A1 | 8/2022 | Jefferies et al. | |
| 2022/0247257 A1 | 8/2022 | Jefferies et al. | |
| 2022/0247258 A1 | 8/2022 | Jefferies et al. | |
| 2022/0247259 A1 | 8/2022 | Jefferies et al. | |
| 2022/0247270 A1 | 8/2022 | Jefferies et al. | |
| 2022/0271607 A1 | 8/2022 | Kwak et al. | |

FOREIGN PATENT DOCUMENTS

| | | | |
|---|---|---|---|
| EP | 2401516 | B1 | 3/2018 |
| EP | 3387298 | B1 | 10/2019 |
| JP | 6025761 | B2 | 11/2016 |
| WO | 2019200863 | A1 | 10/2019 |
| WO | 2020056824 | A1 | 3/2020 |
| WO | 2021136834 | A1 | 7/2021 |
| WO | 2021208285 | A1 | 10/2021 |

* cited by examiner

MOTOR BEARING SHIELD

RELATED APPLICATION

This utility patent application claims the benefit of U.S. Provisional Patent Application No. 63/537,876, filed Sep. 12, 2023, which is incorporated herein by reference in its entirety.

FIELD

This disclosure relates to a brushless motor in a power tool, and particularly to a bearing shield for a brushless motor.

BACKGROUND

Motors such as brushless DC motors are commonly used in various power tool applications. In tools such as cordless nailers, the brushless motor may be used to generate enough rotary torque to drive a driver that in turns fires a nail into a workpiece. In various examples, described in U.S. Pat. Nos. 9,346,158, 10,766,128, 11,081,933, each of which is incorporated herein by reference in its entirety, the motor may be an outer-rotor brushless motor with an integrated flywheel that transfers the rotary output of the motor to linear motion upon contact with the driver.

The rotor flywheel and other rotor components experience wear with usage over a long period of time, causing metal or magnetic particles to detach from various motor components and build up in areas of the motor that increase friction and adversely impact the motor performance. What is needed is a motor structure that seeks to prevent such built-up of material.

SUMMARY

According to an embodiment of the invention, an electric motor is provided comprising: a stator including a plurality of windings mounted on a center shaft; a rotor arranged outside the stator and supporting at least one permanent magnet in magnetic interface with the plurality of windings; a bearing support structure fixedly mounted on the center shaft adjacent the stator; a bearing located between the bearing support structure and the rotor to rotationally support the rotor relative to the center shaft, the bearing including a first portion and a second portion; and a bearing shield located adjacent the bearing within the rotor, the bearing shield including a first annular portion in contact with the first portion of the bearing, a flexible portion comprising elastically deformable material that biasingly maintains the first annular portion in contact with the first portion of the bearing, and a second annular portion that extends proximate the second portion of the bearing and forms an air gap therebetween, wherein the air gap is sized to allow relative rotation between the second annular portion and the second portion of the bearing but substantially block passage of metal particles therebetween.

In an embodiment, the bearing support structure is sized such that the bearing is axially aligned with at least one of an outer circumferential surface of the stator or the at least one permanent magnet of the rotor.

In an embodiment, the first portion of the bearing is an outer race of the bearing coupled to the rotor, and the second portion of the bearing is an inner race of the bearing coupled to the bearing support structure.

In an embodiment, the second annular portion is radially inward of the first annular portion and the first annular portion is located proximate an inner surface of the rotor.

In an embodiment, the rotor comprises a magnet retaining structure that supports the at least one permanent magnet, and the flexible portion engages the magnet retaining structure such that the bearing shield is compressed between the rotor and the bearing.

In an embodiment, the bearing shield comprises a ring-shaped rigid main body that forms the first annular portion.

In an embodiment, the ring-shaped rigid main body further comprises a plurality of slots, and the flexible portion is insert-molded to the ring-shaped rigid main body via an insert-molded material passing through the plurality of slots.

In an embodiment, the flexible portion comprises an O-ring compressed between a face of the ring-shaped rigid main body and a part of the motor.

In an embodiment, the ring-shaped rigid main body is axially aligned with at least one of an outer circumferential surface of the stator or the at least one permanent magnet of the rotor.

According to an embodiment, a power tool is provided including a housing, and an electric motor disposed within the housing. The electric motor may include the features described above.

BRIEF DESCRIPTION OF THE DRAWINGS

The drawings described herein are for illustration purposes only and are not intended to limit the scope of this disclosure in any way.

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
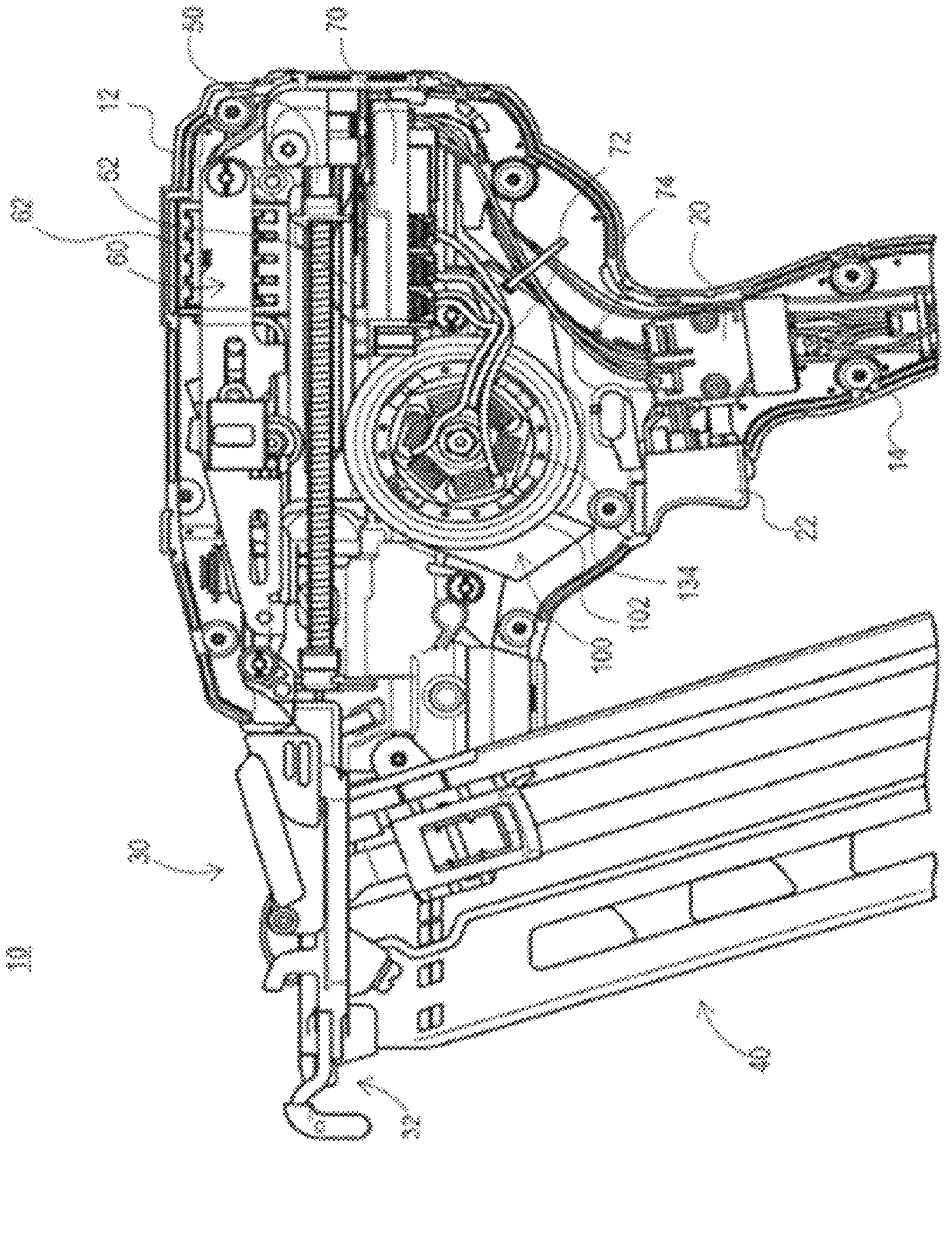
FIG. 1 depicts a side cross-sectional view of an exemplary fastening power tool, according to an embodiment.

FIG. 1 depicts a perspective view of a fastening tool 10 (e.g., a nailer) with a housing half removed, according to an embodiment. The fastening tool 10 shown herein includes an outer-rotor brushless DC motor 100. The outer rotor of the motor 100 is integrally formed with a flywheel 102. In an embodiment, the fastening tool 10 further includes a housing 12, an input unit 20 housed within a handle 14 of the housing and coupled to an actuator 22 disposed outside the housing 12, and a control unit 70.

In an embodiment, control unit 70 includes a micro-controller or other programmable control module and an inverter circuit for controlling a commutation of the motor 100. Control unit 70 is coupled to a power source (not shown), which may be a DC power source (e.g., a removable battery pack) or an AC power source (e.g., a 120V AC). Control unit 70 is also coupled to the input unit 20 via wires 74 to receive input signals indicative of actions desired by the user. The control module regulates a supply of power from the power source to the motor 100 based on a logic signal from the input unit 20. Control unit 70 is coupled to motor terminals via three lead wires 72. The inverter circuit may be, for example, a three-phase inverter circuit including three high-side solid-state switches and three low-side solid-state switches. The switching operation of the solid-state switches is controlled by the control module, which regulates supply of electric power from the power supply to the motor 100.

In an embodiment, fastening tool 10 further includes a nosepiece assembly 30 including a contract trip mechanism 32 coupled to the housing 12, a magazine assembly 40, a driver assembly 50 including a driver 52 and a return mechanism 52, an activation assembly 60, and a solenoid 62, among other components. In an embodiment, actuation of the actuator 22 while contact trip mechanism 32 is in contact with a workpiece causes the solenoid 62 to engage the activation assembly 62. Activation assembly 62 translates forward and engages the driver 52 to initiate driving engagement between the driver 52 and the flywheel 102. In an embodiment, the flywheel 102 includes one or more flywheel rings that form one or more grooves around the outer surface of the flywheel 102. The driver 52 includes corresponding railings that engage the grooves of the flywheel. Rotation of the flywheel 102 causes the driver 52 to accelerate axially and drive a fastener into a workpiece.

The present disclosure is focused on the structure and features of the motor 100. Details of the components and operation of an exemplary fastening tool are beyond the scope of this disclosure and can be found in U.S. Pat. No. 6,971,567 and U.S. Patent Publication No. 2012/0097729, all of which are incorporated herein by reference in their entirety. It is further noted that while the motor 100 of this disclosure is described with reference to a fastening tool according to an exemplary embodiment, motor 100 may similarly be used in other power tools and other rotary devices.

Figure 2:
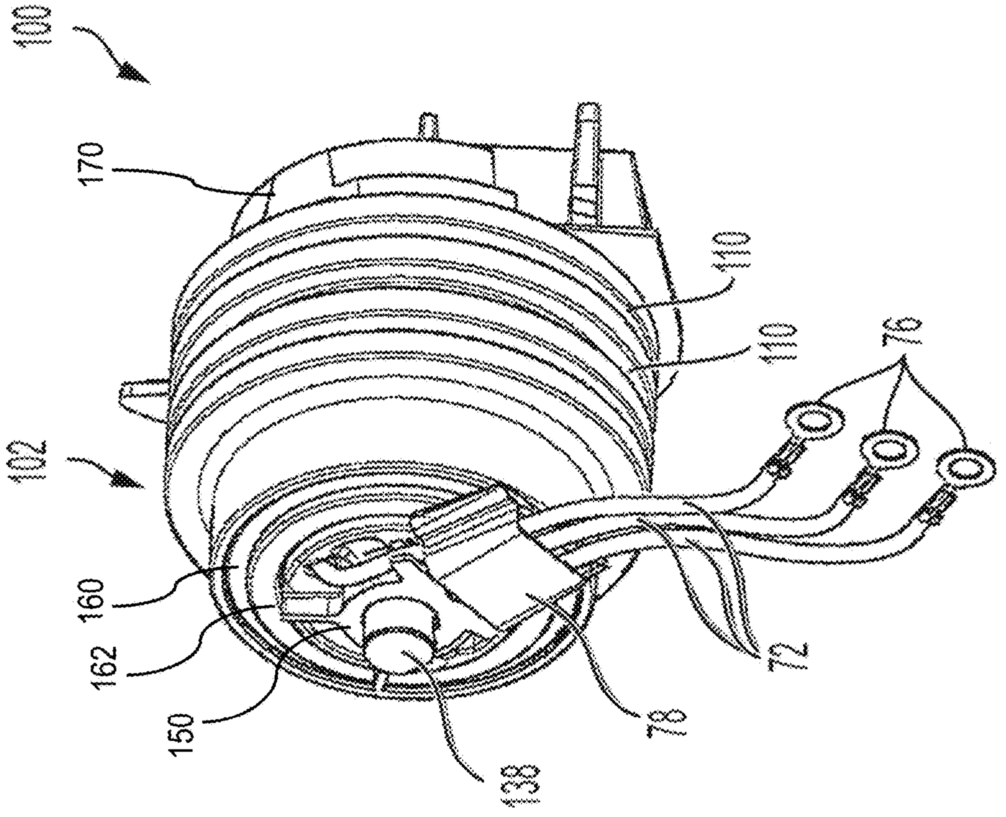
FIG. 2 depicts a perspective view of an outer-rotor brushless DC motor in the fastening tool, according to an embodiment.
Figure 3:
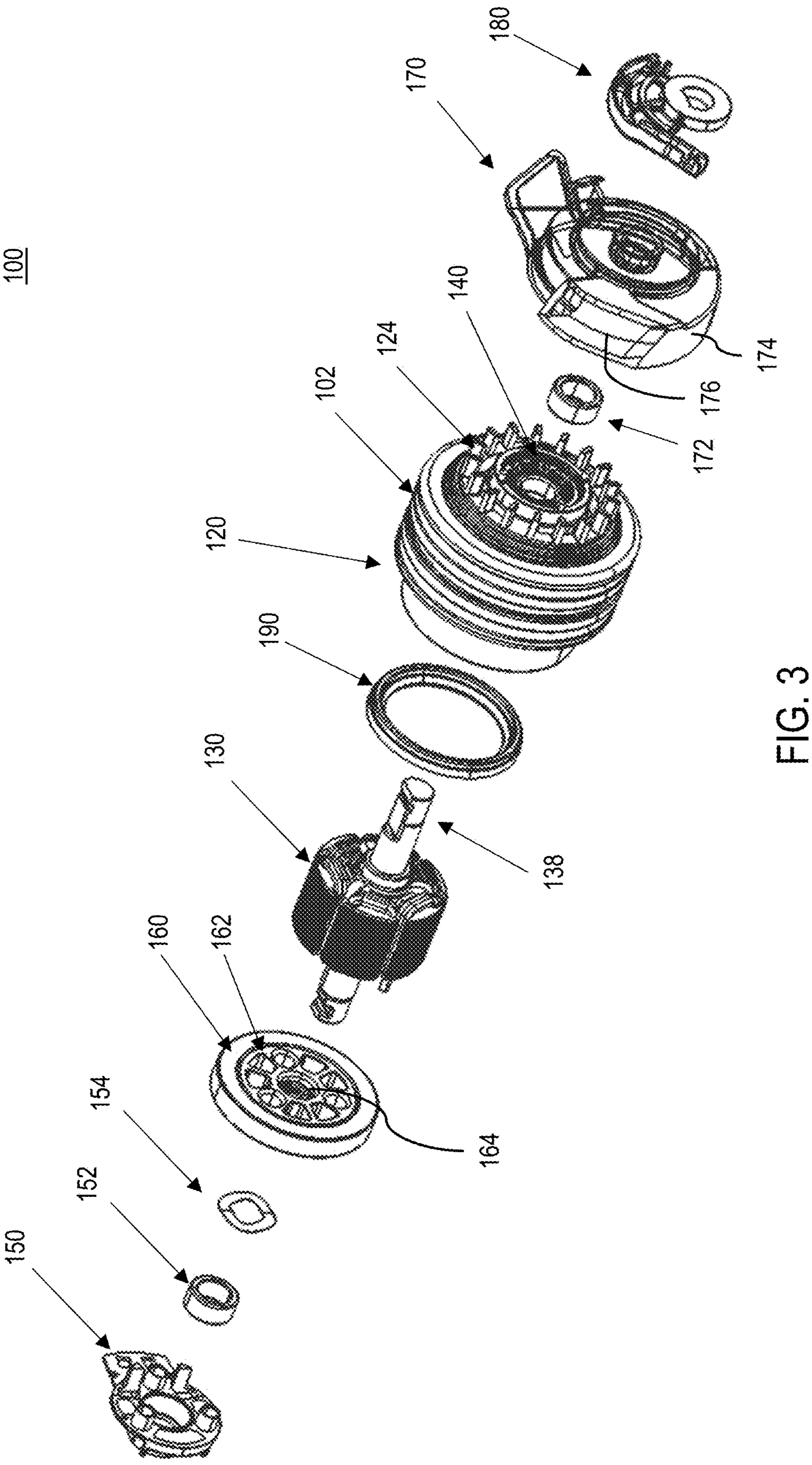
FIG. 3 depicts an exploded view of the outer-rotor brushless DC motor, according to an embodiment.
Figure 4:
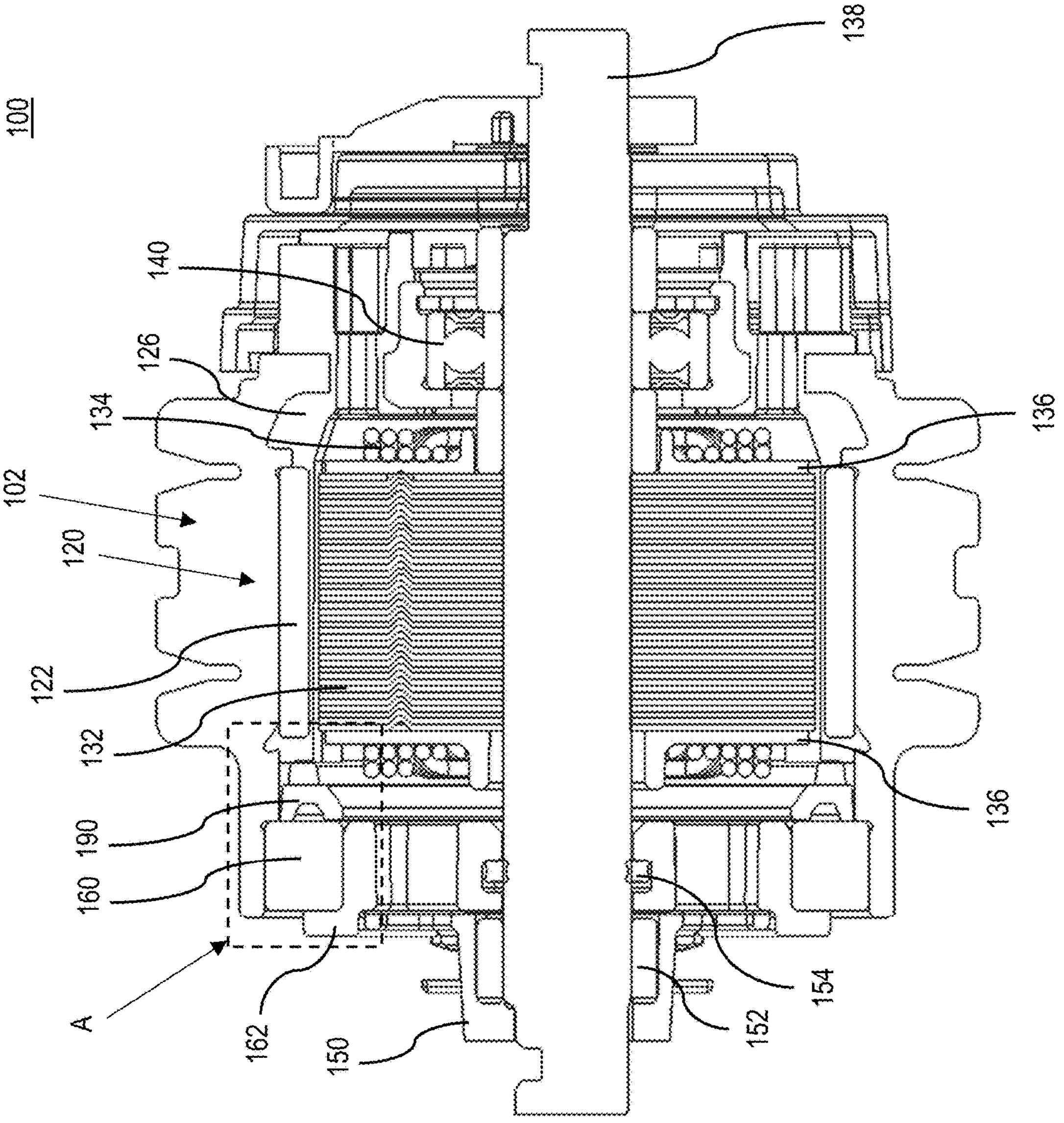
FIG. 4 depicts a side cross-sectional view of the motor, according to an embodiment.

FIG. 2 depicts a perspective view of outer-rotor brushless DC motor 100 in the fastening tool, according to an embodiment. FIG. 3 depicts an exploded view of outer-rotor brushless DC motor 100, according to an embodiment. FIG. 4 depicts a side cross-sectional view of the motor 100, according to an embodiment.

In an embodiment, motor 100 includes an outer rotor 120 and an inner stator 130.

In an embodiment, outer rotor 120 has a generally cylindrical piped-shaped body with permanent magnets 122 mounted on its inner surface. In an embodiment, an overmold layer 126 may be provided to secure the magnets 1212 on the inner surface of the outer rotor 120. In an embodiment, a fan 124 may also be formed via the overmold layer 126, or separately attached to the outer rotor 120 to generate airflow with the rotation of the outer rotor 120.

In an embodiment, outer rotor 120 is provided with a flywheel 102 having three flywheel annular rings 110 that form grooves 112 therebetween around the outer surface of the flywheel 102. In an embodiment, flywheel 102 is formed integrally with rotor 120 on an external circumferential surface of the rotor 120 having an increased diameter compared to the remainder of the rotor 120. Alternatively, flywheel 102 may be provided as a separate part attached to an outer surface of the rotor 120. Flywheel 102 may be made of metal such as steel.

In an embodiment, stator 130 includes a stator lamination stack 132 having a plurality of stator teeth projecting from an inner core, with slots formed between the stator teeth. Stator windings 134 are formed of magnet wire wound around the stator teeth to fill in the stator slots, defining the phases of the motor 100. In an embodiment, where motor 100 is a three-phase BLDC motor, three windings 134 defining the three phases of the motor 100 are disposed around the stator lamination stack 132, each winding 134 being wound on opposite two teeth across one another. In an embodiment, stator 130 further includes two end insulators 136 attached to the end surfaces of the stator lamination stack 132.

In an embodiment, the stator lamination stack 132 is mounted (e.g., via press-fitting) on a shaft 138. A front bearing 140 may be further mounted on the shaft 138 on one side of the stator 130. An outer race of the front bearing 140 is secured to the rotor 120 to provide axial and radial support for the rotor 120 relative to the shaft 138 (and thus relative to the stator 130), while allowing the rotor 120 to rotate freely about the axis of the shaft 138.

Further, in an embodiment, a bearing support structure 162 mounted on the shaft 138 on the other side of the stator 130. The bearing support structure 162 includes a center through-hole mounted on the shaft 138. The bearing support structure 162 may be securely mounted on the shaft via press-fitting. Alternatively, in an embodiment, the bearing support structure 162 may be slip fit on the shaft via a wave spring 154, which transmits torque to the rear bearing 160 via the bearing support structure 162. Thus, the bearing support structure 162 is rotationally fixed relative to the stator 130 and the shaft 138. In an embodiment, a rear bearing 160 is positioned between the bearing support structure 162 and the rotor 120 to provide further provide axial and radial support for the rotor 120 relative to the shaft 138 (and thus relative to the stator 130), while allowing the rotor 120 to rotate freely about the axis of the shaft 138. In an embodiment, the rear bearing 160 has a larger diameter than the stator 130, and the inner race of the rear bearing 160 is securely mounted on the outer circumference of the bearing support structure 162, whereas the outer race of the rear bearing 160 is securely mounted inside the inner surface of the rotor 120.

In an embodiment, as the stator windings 134 are energized in a controlled sequence, they create a magnetic field that interacts with the permanent magnets of the outer rotor 120, thus causing rotation of the outer rotor 120 around the stator 130.

In an embodiment, the stator windings 134 are formed of magnet wire wound around stator teeth. In an embodiment, ends of magnet wires, after stator windings 134 are fully wound, are guided out of the stator slots to form the lead wires 72 for electric coupling to the control unit 70. The ends of lead wires 72 may be provided with terminals 76 that facilitate electrical coupling to a connector on the control unit 70. In an embodiment, a guide member 150 is mounted adjacent a rear end of the bearing support structure 162 to guide the lead wires 72 coming out of the stator 130 in a radial direction away from the motor 100. In an embodiment, a heat sink 78 is mounted on the guide member 150 to lock the wires 72 in place. In an embodiment, the guide member 150 is mounted on the shaft 138 via a bushing 152.

In an embodiment, a fan baffle 170 is mounted on the shaft 138 via a bushing 172 adjacent the fan 124. The fan baffle 170 includes a circumferential wall 174 formed around the fan 124, with air outlets 176 surrounding fan 124 to allow airflow generated by the fan to be exhausted radially away from the motor. In an embodiment, a wire trap 180 is further mounted at a distal end of the motor 100 adjacent the fan baffle 170.

With repeated motor use over a long period of time, rotating parts of the motor including, but not limited to, the rotor flywheel 102 and other rotor 120 components have been seen to experience some level of wear, causing small metal and/or magnetic particles to separate from the magnets 122 over time and stick to other metal parts of the motor. Build-up of this material in moving components of the motor may increase friction and adversely impact motor performance. In some embodiments, since a front face of the rear bearing 160 facing the rotor is exposed to the rotor 120, the rear bearing 160 has been particularly prone to build-up of such contamination, causing undesirable slowdown in the motor performance.

To overcome this problem, according to an embodiment, motor 100 is provided with a bearing shield 190 located between the rear bearing 160 and the rotor 120. In an embodiment, the bearing shield 190 substantially shields the rear bearing 160 from entry of metal particles without interfering with the free and unhindered rotation of the rear bearing 160, as discussed below in detail.

Figure 5:
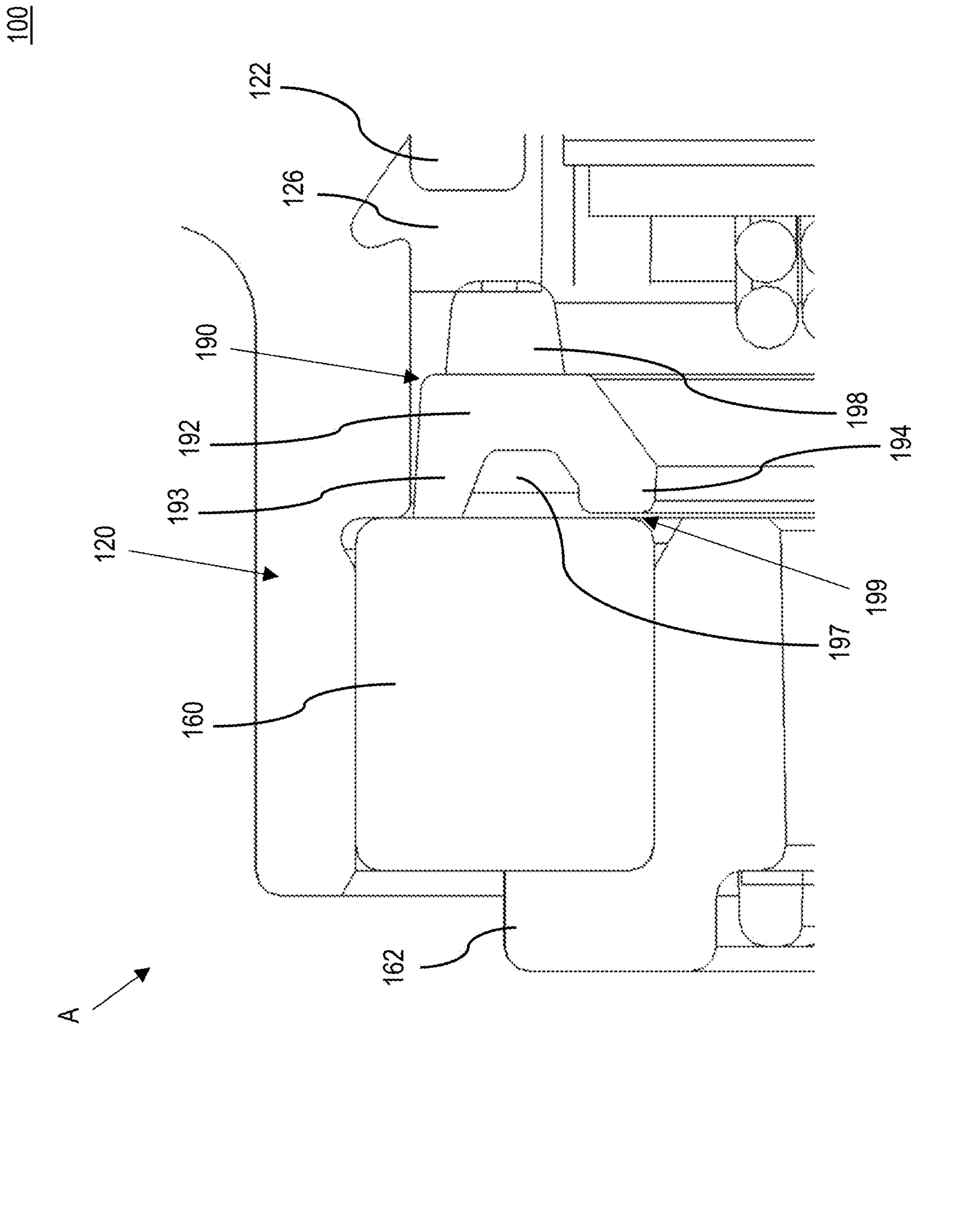
FIG. 5 depicts a zoomed-in cross-sectional view of the motor including a bearing shield, according to an embodiment.
Figure 6:
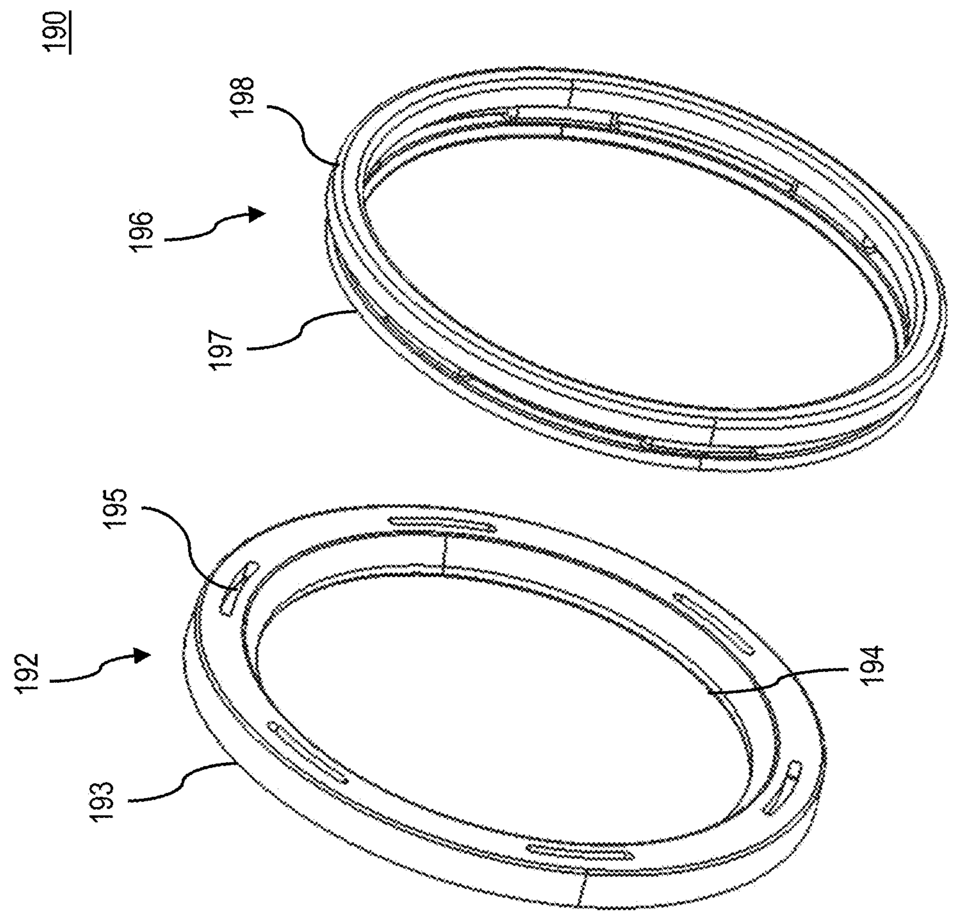
FIG. 6 depicts an exploded view of the bearing shield, according to an embodiment.
Figure 7:
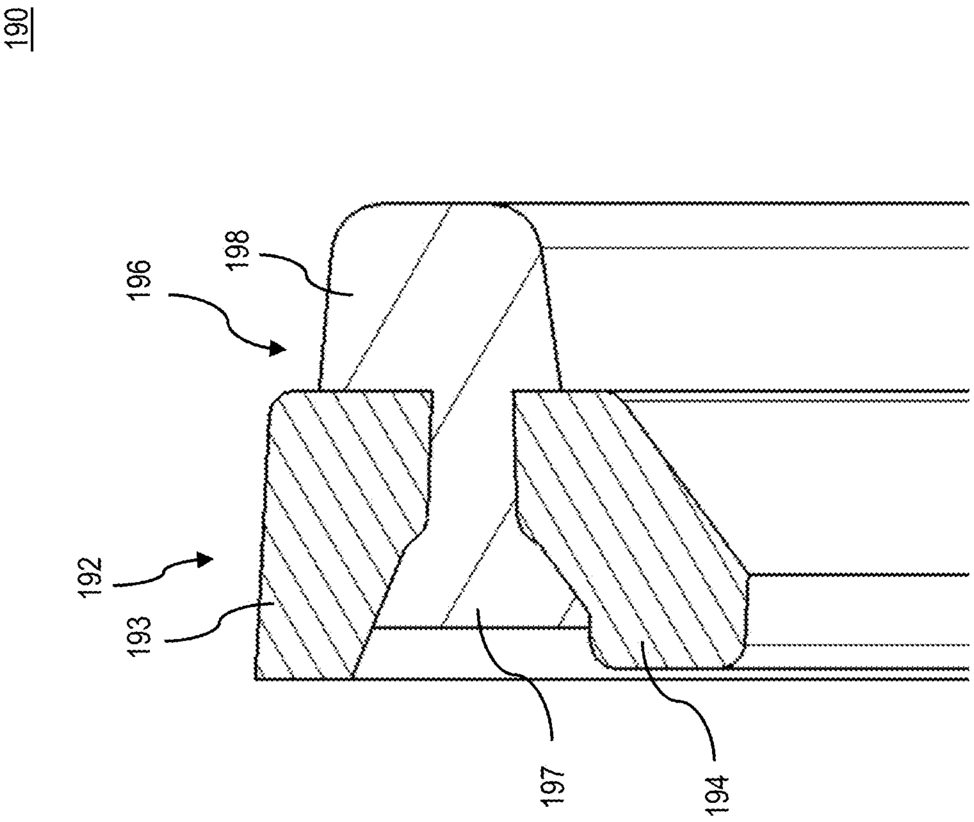
FIG. 7 depicts a further zoomed-in cross-sectional view of the bearing shield, according to an embodiment.

FIG. 5 depicts a partial cross-sectional view of the motor 100 (i.e., box A in FIG. 4) including the bearing shield 190, according to an embodiment. FIG. 6 depicts an exploded view of a bearing shield 190, according to an embodiment. FIG. 7 depicts a further zoomed-in cross-sectional view of the bearing shield 190, according to an embodiment.

In an embodiment, bearing shield 190 includes a ring-shaped rigid main body 192 that forms two annular portions 193 and 194. In an embodiment, the main body 192 also includes a series of slots 195 formed therein discussed later. In an embodiment, the rigid main body 192 may be made of metal or other robust structure such as high-rigidity Nylon material. In an embodiment, the first annular portion 193 extends in the direction of the rear bearing 160 adjacent an inner surface of the rotor 120 and physically contacts an outer portion (i.e., outer race) of the rear bearing 160. In an embodiment, the second annular portion 194 is located radially inward of the first annular portion 193 and extends in the direction of an inner portion (i.e., inner race) of the rear bearing 160, but it does not come into contact with the inner portion of the rear bearing 160. Rather, the second annular portion 194 is smaller in axial length than the first annular portion 193 to maintain a small axial gap 199 between the inner portion of the rear bearing 160 and the second annular portion 194 of the bearing shield 190. The air gap 199 is sufficiently small in the axial direction (i.e., smaller than approximately 1 mm, preferably smaller than or equal to approximately 0.3 mm, more preferably in the range of 0.1 to 0.2 mm) to ensure that the bearing shield 190 substantially blocks metal particulate and other dust or debris particles from coming into contact with the front face of the rear bearing 160, without making physical contact with the inner race of the bearing to interfere with the rotation of the rotor 120 relative to the rear bearing 160.

In an embodiment, bearing shield 190 further includes a flexible portion 196 made of elastically-deformable material such as Thermoplastic Elastomer (TPE) or other flexible resin material. In an embodiment, flexible portion 196 includes an anchor portion 197 formed between the two annular portions 193 and 194, and a compression portion 198 formed forward of the main body 192. The compression portion 198 axially engages an end of a magnet retaining structure of the rotor 120 (which in this example is the overmold layer 126 that retains the magnets 122 on the inner surface of the rotor 120) to flexibly locate the main body 192 relative to the rotor 120 in the axial direction. This arrangement ensures that the bearing shield 190 is axially restrained and securely compressed between the rear bearing 160 and the rotor 120 and does not separate from the rear bearing 160. In an embodiment, the flexible portion 196 is formed using an injection-molding process, with molded material passing through the slots 195 of the main body 192 to form the anchor portion 197 and the compression portion 198.

The bearing shield 190 described herein by way of example provides an efficient and easy to manufacture structure to protect the rear bearing 160 from contamination, particularly by metallic particulate caused due to wear and age of the rotor 120 and/or the flywheel 102. It should be understood that while bearing shield 190 in this example is for use with the rear bearing, the front bearing 140 may be similarly protected. In an embodiment, the bearing shield may be sized appropriately to protect any motor bearing of any size or specification. Further, while in this embodiment, the first annular member 193 makes contact with the outer race of the bearing while the second annular member 194 is spaced apart from the inner race, it is envisioned that for some bearings, the inner annular member of the bearing shield may make contact with the inner race of the bearing while the outer annular member of the bearing shield is spaced apart from the outer race.

While the bearing shield 190 is described herein as a one-piece component including rigid and flexibly-deformable pieces formed together in an injection-molding process, it should be understood that the rigid and flexibly-deformable pieces may be provided and assembled separately. In an example, the flexible portion 196 may be an O-ring disposed between a frontal end of the rigid main body 192 and the overmold layer 126.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "power tool" used herein to refer to a rotary device powered by an electric power source and utilized for various applications including, but not limited to, home improvement, construction, automotive repair, outdoor and landscaping maintenance, etc. These include, but are not limited to, angle grinders, die grinders drills, impact drivers, drill drivers, hammers, hammer drills, circular saws, reciprocating saws, miter saws, nailers, polishers, cut-out tools, wrenches, ratchets, sanders, lawn mowers, edgers, trimmers, chain saws, and other lawn maintenance and/or landscaping ride-on equipment.

The invention claimed is:

1. An electric motor comprising:

a stator including a plurality of windings mounted on a center shaft;

a rotor arranged outside the stator and supporting at least one permanent magnet in magnetic interface with the plurality of windings;

a bearing support structure fixedly mounted on the center shaft adjacent the stator;

a bearing located between the bearing support structure and the rotor to rotationally support the rotor relative to the center shaft, the bearing including a first portion and a second portion; and a bearing shield located adjacent the bearing within the rotor, the bearing shield including a first annular portion in contact with the first portion of the bearing, a flexible portion comprising elastically deformable material that biasingly maintains the first annular portion in contact with the first portion of the bearing, and a second annular portion that extends proximate the second portion of the bearing and forms an air gap therebetween, wherein the air gap is sized to allow relative rotation between the second annular portion and the second portion of the bearing but substantially block passage of metal particles therebetween.

2. The electric motor of claim 1, wherein the bearing support structure is sized such that the bearing is axially aligned with at least one of an outer circumferential surface of the stator or the at least one permanent magnet of the rotor.

3. The electric motor of claim 1, wherein the first portion of the bearing is an outer race of the bearing coupled to the rotor, and the second portion of the bearing is an inner race of the bearing coupled to the bearing support structure.

4. The electric motor of claim 3, wherein the second annular portion is radially inward of the first annular portion and the first annular portion is located proximate an inner surface of the rotor.

5. The electric motor of claim 3, wherein the rotor comprises a magnet retaining structure that supports the at least one permanent magnet, and the flexible portion engages the magnet retaining structure such that the bearing shield is compressed between the rotor and the bearing.

6. The electric motor of claim 1, wherein the bearing shield comprises a ring-shaped rigid main body that forms the first annular portion.

7. The electric motor of claim 6, wherein the ring-shaped rigid main body further comprises a plurality of slots, wherein the flexible portion is insert-molded to the ring-shaped rigid main body via an insert-molded material passing through the plurality of slots.

8. The electric motor of claim 6, wherein the flexible portion comprises an O-ring compressed between a face of the ring-shaped rigid main body and a part of the motor.

9. The electric motor of claim 6, wherein the ring-shaped rigid main body is axially aligned with at least one of an outer circumferential surface of the stator or the at least one permanent magnet of the rotor.

10. A power tool comprising:

a housing; and an electric motor disposed within the housing for driving an output, the electric motor comprising:

a stator including a plurality of windings mounted on a center shaft;

a rotor arranged outside the stator and supporting at least one permanent magnet in magnetic interface with the plurality of windings;

a bearing support structure fixedly mounted on the center shaft adjacent the stator;

a bearing located between the bearing support structure and the rotor to rotationally support the rotor relative to the center shaft, the bearing including a first portion and a second portion; and a bearing shield located adjacent the bearing within the rotor, the bearing shield including a first annular portion in contact with the first portion of the bearing, a flexible portion comprising elastically deformable material that biasingly maintains the first annular portion in contact with the first portion of the bearing, and a second annular portion that extends proximate the second portion of the bearing and forms an air gap therebetween, wherein the air gap is sized to allow relative rotation between the second annular portion and the second portion of the bearing but substantially block passage of metal particles therebetween.

11. The power tool of claim 10, wherein the bearing support structure is sized such that the bearing is axially aligned with at least one of an outer circumferential surface of the stator or the at least one permanent magnet of the rotor.

12. The power tool of claim 11, wherein the first portion of the bearing is an outer race of the bearing coupled to the rotor, and the second portion of the bearing is an inner race of the bearing coupled to the bearing support structure.

13. The power tool of claim 12, wherein the second annular portion is radially inward of the first annular portion and the first annular portion is located proximate an inner surface of the rotor.

14. The power tool of claim 12, wherein the rotor comprises a magnet retaining structure that supports the at least one permanent magnet, and the flexible portion engages the magnet retaining structure such that the bearing shield is compressed between the rotor and the bearing.

15. The power tool of claim 10, wherein the bearing shield comprises a ring-shaped rigid main body that forms the first annular portion.

16. The power tool of claim 15, wherein the ring-shaped rigid main body further comprises a plurality of slots, wherein the flexible portion is insert-molded to the ring-shaped rigid main body via an insert-molded material passing through the plurality of slots.

17. The power tool of claim 15, wherein the flexible portion comprises an O-ring compressed between a face of the ring-shaped rigid main body and a part of the motor.

18. The power tool of claim 15, wherein the ring-shaped rigid main body is axially aligned with at least one of an outer circumferential surface of the stator or the at least one permanent magnet of the rotor.

19. An electric motor comprising:

a stator including a plurality of windings;

a rotor arranged outside the stator and supporting at least one permanent magnet in magnetic interface with the plurality of windings;

a bearing arranged to rotationally support the rotor relative to the stator, the bearing including a first portion and a second portion; and a bearing shield located adjacent the bearing within the rotor, the bearing shield including a first annular portion in contact with the first portion of the bearing, a flexible portion comprising elastically deformable material that biasingly maintains the first annular portion in contact with the first portion of the bearing, and a second annular portion that extends proximate the second portion of the bearing and forms an air gap therebetween, wherein the air gap is sized to allow relative rotation between the second annular portion and the second portion of the bearing but substantially block passage of metal particles therebetween.

* * * * *